United States Patent [19]

Williams

[11] Patent Number: 4,515,200

[45] Date of Patent: May 7, 1985

[54] APPARATUS FOR WHITEWALLING VEHICLE TIRES

[76] Inventor: Roy L. Williams, 6212 Nora St., Metairie, La. 70003

[21] Appl. No.: 497,648

[22] Filed: May 24, 1983

[51] Int. Cl.³ .......................................... B29H 21/08
[52] U.S. Cl. .................................. 157/13; 51/106 R; 156/116
[58] Field of Search .................... 157/13; 156/116, 96, 156/394.1, 110.1; 51/106 R; 425/289, 11

[56] References Cited

U.S. PATENT DOCUMENTS

| | | | |
|---|---|---|---|
| 2,810,238 | 10/1957 | Yoho et al. | 51/106 R |
| 2,843,877 | 7/1958 | Wolfe | 425/11 |
| 3,097,685 | 7/1963 | Woodard | 157/13 |
| 3,137,976 | 6/1964 | Cooper | 51/106 R |
| 3,218,208 | 11/1965 | Molen | 156/116 |
| 3,473,596 | 10/1969 | Meixner | 51/106 R |
| 3,521,408 | 7/1970 | Neugebauer | 51/106 R |
| 3,583,105 | 6/1971 | Popp | 51/179 |
| 3,910,228 | 10/1975 | Doll | 156/116 |
| 4,131,149 | 12/1978 | Roberts, Jr. | 156/116 |
| 4,177,233 | 12/1979 | Roberts, Jr. | 264/162 |
| 4,311,182 | 1/1982 | Clayton | 157/13 |

FOREIGN PATENT DOCUMENTS

880745 10/1961 United Kingdom ............ 51/106 R

*Primary Examiner*—Bradley Garris
*Assistant Examiner*—James C. Housel
*Attorney, Agent, or Firm*—Bode & Smith

[57] ABSTRACT

A method of cutting grooves and whitewalling vehicle tires in a series of functional steps, employing an apparatus which comprises a tire buffing assembly swively mounted upon an arm assembly allowing adjustment of the buffing assembly. There is further provided speed control means for controlling the variable speed of the drive means for rotating a reversible wheel drive member for rotating the tire during the buffing steps. The buffing assembly would have a plurality of buffing blades depending on the size of the strip to be buffed, and would be electrically driven. There is further provided means for maneuvering the apparatus via a handle and wheel members and a seating means for affording comfort during the operation of the apparatus.

4 Claims, 4 Drawing Figures

APPARATUS FOR WHITEWALLING VEHICLE TIRES

BACKGROUND OF THE INVENTION

1. Field of the Invention

The method and apparatus of the present invention relates to refinishing vehicle tires. In particular, the method and apparatus of the present invention relates to grooving into the surface of vehicle tires and applying sidewalls or whitewalls therein while the tire remains in tact on the vehicle.

2. General Background

In the industry of the manufacture and sale of automobile tires, a great number of tires, because of one reason or another, are sold with a new or used automobile having no whitewall or sidewalling effect, with simply the blackwalls being the standard equipment. Particularly in the major countries of Europe, whitewall tires on automobiles are rather uncommon, and for the most part, most European automobile manufacturers provide blackwalls with the new automobiles as they come off of the assembly line.

It is often the case that the purchaser of an automobile or the like would prefer to have the whitewalling on the automobile rather than the blackwall, and thus, must go to the added expense of purchasing a new set of tires having the whitewall thereupon, or possibly have the whitewall placed on an existing blackwall tire. The present invention addresses this particular concern.

In the present state of the art, there are several apparatuses on the market which attempt to add white sidewalls to existing blackwall tires while the tires remain on the vehicle. Also, there have been means developed to add whitewall to an existing blackwall tire by removing the tire from the automobile, placing the tire on a relatively complex device for rotating the tire while attempting to cut a groove in the side of the tire and filling the groove with liquid rubber and the finishing buffing. This particular system, which we discussed in a patent cited in this application, has fallen short of the requirements in order to obtain a tire which is both asthetically presentable and maintains its structural integrity following the grooving out process.

There have been several patents which address the whitewalling of automobile tires, the most pertinent being as follows:

U.S. Pat. No. 3,218,208 issued to O. C. Molen entitled "Methods Of Applying Decorative Strips To Tire Sidewalls" relates to a method and apparatus for adding strips to the sidewalls of tires. In this particular patent, the tire must be removed from the automobile and placed upon an assembly whereby the tire is rotated and the grooving member is allowed to make contact with the edge of the tire thus cutting out the necessary groove for adding the whitewall or the like strip.

The most serious set back in this particular means of accomplishing a result is the fact that the tire must be removed from the automobile and thus when the rotation occurs, does not achieve the stable rotation as it would were it mounted to the automobile.

U.S. Pat. No. 3,583,105 issued to Pop entitled "Apparatus For Cutting Grooves In Vehicle Tires" also teaches the use of a similar apparatus as in the '208 Molin patent. However, in this particular apparatus, the tire is maintained on the automobile, and the grooving apparatus is mounted onto a platform wherein a swivel arm is allowed to make contact with the edge of the tire. The tire is rotated via dual extended rollers. However, a single grooving element can be utilized during this particular system, unlike the embodiment of the present invention.

U.S. Pat. No. D 247,907 issued to Satterfield entitled "Tire Refinishing Apparatus" relates to the ornamental design of a tire refinishing apparatus, and as a design patent, does not make any claim to the functional system itself.

Other patents which may be pertinent to the art of tire refinishing apparatus are as follows:
U.S. Pat. No. 1,400,971 Nye
U.S. Pat. No. 1,567,472 Skiles
U.S. Pat. No. 2,649,665 Anderson et al
2,651,893 Braley
U.S. Pat. No. 2,765,845 Bullis
U.S. Pat. No. 2,810,238 Yoho et al
U.S. Pat. No. 2,897,882 Barrett

GENERAL DISCUSSION OF THE PRESENT INVENTION

The preferred embodiment of the method and apparatus of the present invention relates to important improvements in the present state of the art in a rather simple and straightforward manner. What is provided is a method of cutting grooves and whitewalling vehicle tires in a series of functional steps, employing an apparatus which comprises a tire buffing assembly swivelly mounted upon an arm assembly allowing adjustment of the buffing assembly. There is further provided speed control means for controlling the variable speed of the drive means for rotating a reversible wheel drive member for rotating the tire during the buffing steps. The buffing assembly would have a plurality of buffing blades depending on the size of the strip to be buffed, and would be electrically driven. There is further provided means for maneuvering the apparatus via a handle and wheel members and a seating means for affording comfort during the operation of the apparatus. The method of the invention would include mounting the automobile for allowing at least one wheel to be out of contact with the surface beneath. Positioning the drive means in contact with the under surface of the tire to be buffed. Gauging the electrical means for rotation of the drive shaft for imparting rotation to the automobile tire. Selecting the desirable buffing blade to be utilized. Positioning the buffing blade in contact with surface of the tire and engaging the electrical motor for rotation of the buffing blade. Buffing a uniform strip along a portion of the tire surface as the tire is rotated by the rotation assembly. Applying polymer compound to the base of the tire on the buffed area. Applying whitewalling compound or the like onto the polymer for final preparation of the tire.

Therefore, it is an object of the present invention to provide a method and apparatus of grooving out and whitewalling vehicle tires without removal of the tire from the vehicle.

It is a further object of the present invention to provide a method in conjunction with a particular apparatus for preparing and finishing a blackwall vehicle tire to a finished whitewall striped tire.

It is still a further object of the present invention to provide an apparatus which has a multiple blade assembly for achieving whitewall strips in various widths.

It is still another object of the present invention to provide an apparatus which may serve also as a means for removing striping or the like on the surface of tires through buffing.

It is still a further object of the present invention to provide an apparatus which includes a variable speed means for operating a buffing assembly including swivel means for achieving complete contact with the sidewall to be buffed.

It is still a further object of the present invention to provide an apparatus having means for maneuvering the apparatus and seating means for sitting thereupon and comfortably utilizing the apparatus.

In order to achieve the above objects of the present invention it is a feature of the present invention to provide an apparatus having a variable speed rotating wheel drive assembly for rotating the tire to be buffed;

It is another feature of the present invention to provide an apparatus having a buffing assembly with a plurality of buffing blades in different sizes to achieve different sized grooves in the tire to be buffed.

BRIEF DESCRIPTION OF THE DRAWINGS

For a further understanding of the nature and objects of the present invention, reference should be had to the following detailed description, taken in conjunction with he accompanying drawings, in which like parts are given like reference numerals and, wherein.

DETAILED DESCRIPTION OF THE PREFERRED EMBODIMENT

Figure 1:
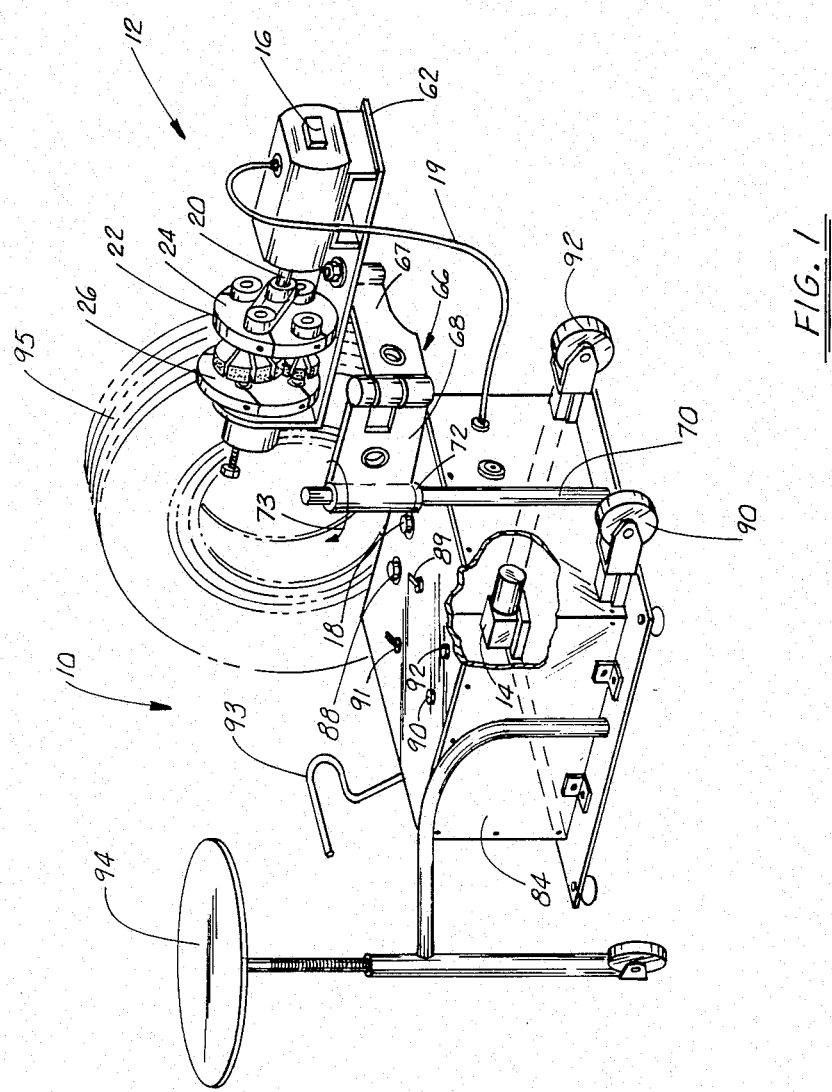
FIG. 1 is an overall perspective view of the preferred embodiment of the apparatus of the present invention.
Figure 2:
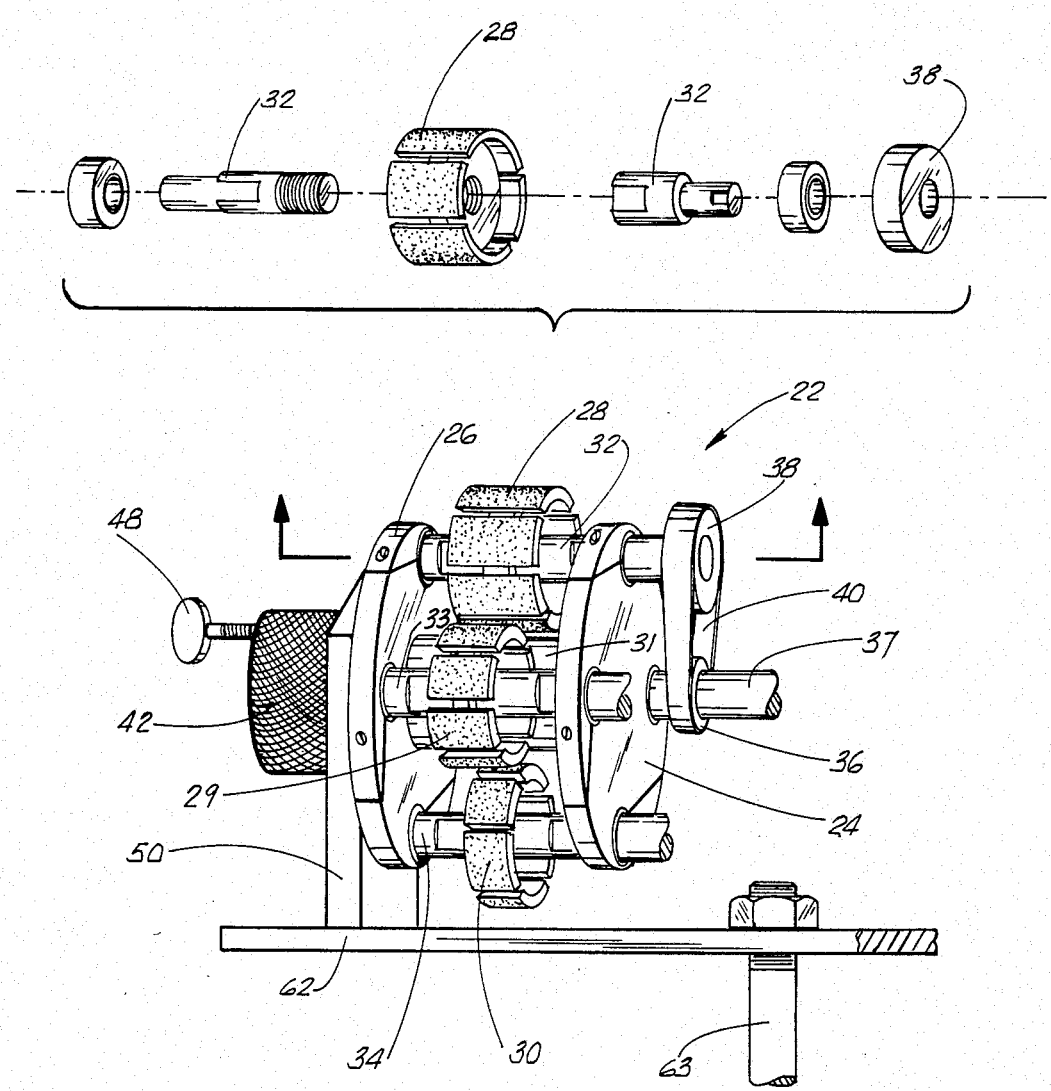
FIG. 2 is a perspective exploded view of the cutting means assembly of the apparatus of the present invention.
Figure 3:
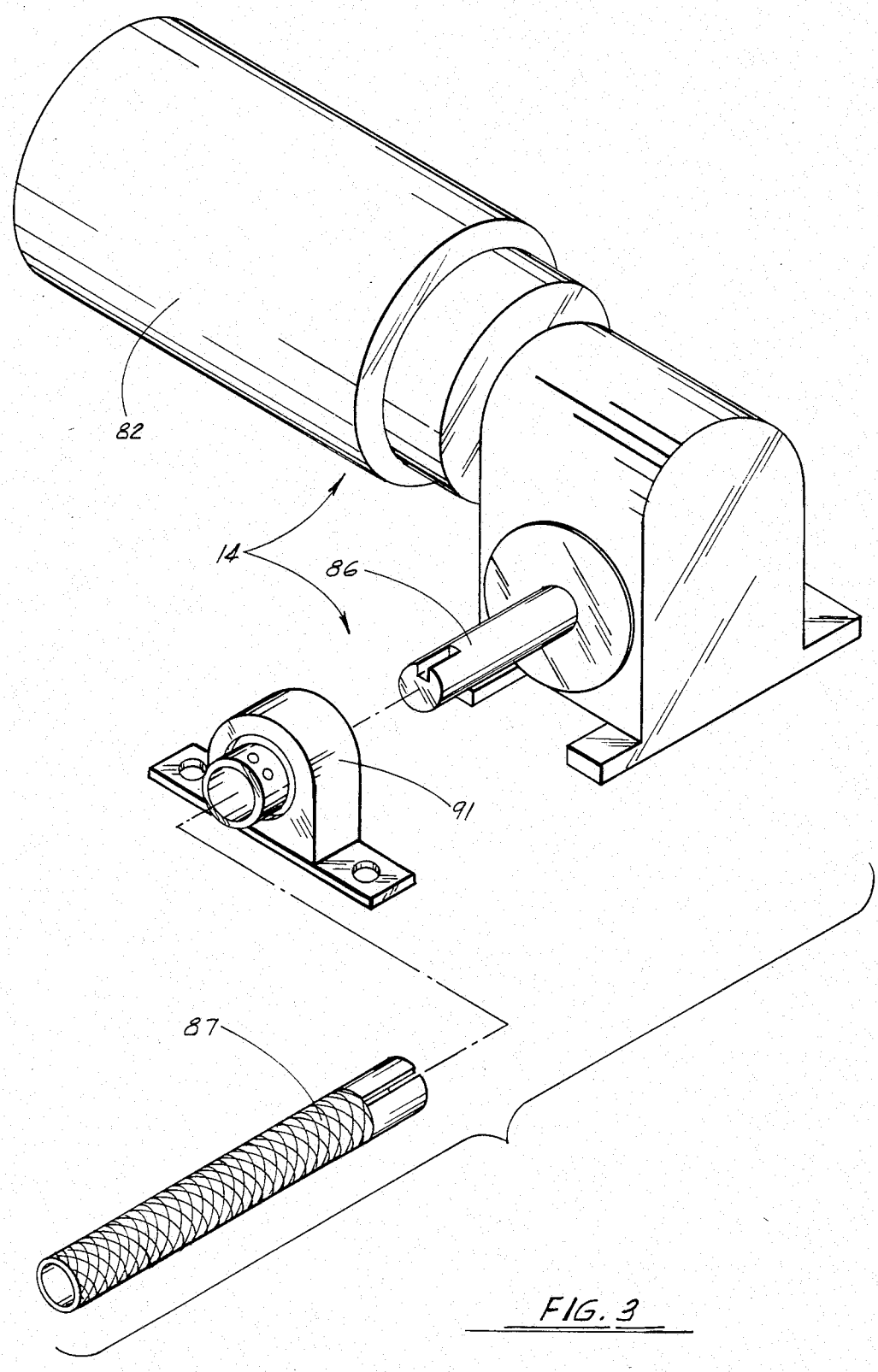
FIG. 3 is a exploded view of the drive means assembly of the apparatus of the present invention.
Figure 4:
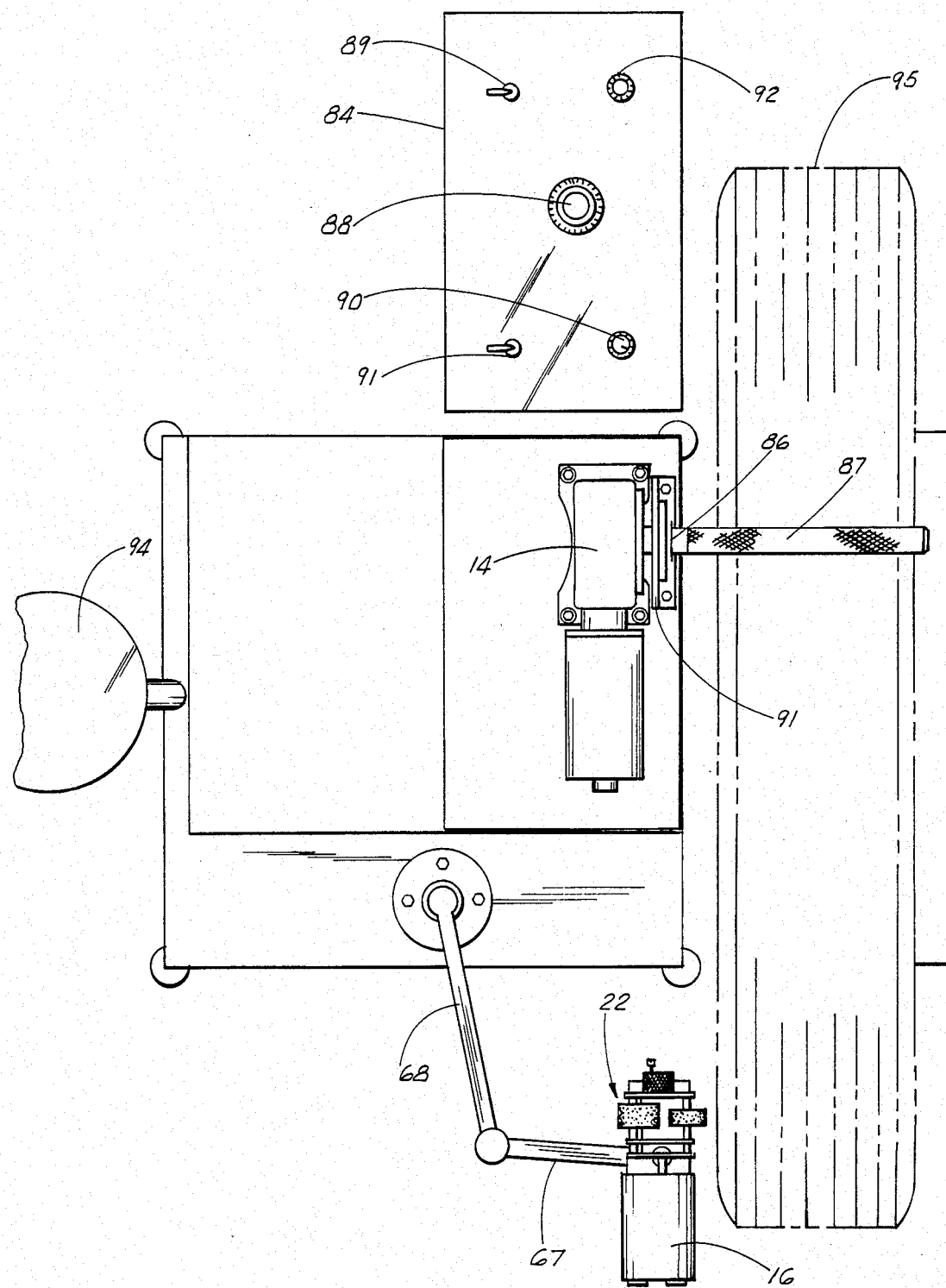
FIG. 4 is a top view of the preferred embodiment of the apparatus of the present invention engaging a tire to be whitewalled.

The preferred embodiment of the apparatus utilized in the method of cutting grooves and whitewalling vehicle tires is illustrated in FIGS. 1 through 3 by the numeral 10. As seen in FIG. 1, in perspective view, apparatus 10 would comprise, in general, buffing assembly means 12 and drive assembly means 14. In the preferred embodiment, buffing assembly means would further comprise drive motor 16, which would have the ability to rotate at approximately 5,000 R.P.M's with a torque equivalent of one and one-half horse power. As is seen in FIG. 1, electrical motor 16 would be connected to control switch 18 via electrical cord 19. Buffing assembly 12 further illustrates electrical motor 16 in driving engagement with buffer blade assembly 22 which, as seen in exploded view in FIG. 2 further comprises first and second mounting plates 24 and 26 with, in the preferred embodiment a plurality of four variable sized buffing blades 28, 29, 30 and 31. In the preferred embodiment, each buffing blade 28 through 31 is rotatably mounted upon a seperate shaft 32, 33, 34, 35 respectively, for imparting individual rotation to each buffing blade, the reason which will be exemplified further.

Buffing assembly 22 is mounted in driving relationship to shaft 20 via central shaft 37, which imparts rotation to buffing assembly 22. In order to impart rotation to the selected cutter buffer blade, there is provided pulley wheel 36 mounted to shaft 37 where shaft 37 is in driving contact with plate 24. There is further provided an equivalent pulley wheel 38 at the end of each of said cutter blade shafts, with pulley belt 40 in driving relation between central shaft 37 and the particular shaft through which is to be rotative as selected. On the back side of plate 26 there is mounted selection knob 42 which simply rotates buffing assembly 22 so that the selected buffer blade is in proper position to be utilized as the blade during a particular job. Once the buffing assembly 22 has been so positioned, thumb screw 48 is screwed in and engages vertical mounting plate 50 so that buffing assembly 22 is in a fixed position during the process, with the rotation of shaft 37 imparting rotation to the selected buffer blade shaft by means of pulley belt 40.

Buffer assembly 22 and drive motor 16 is mounted upon horizontal mounting plate 62 which is a metal plate or the like in swivel engagement with mounting bolt 63. Mounting bolt 63 is mounted on its underside to swivel assembly 66 which has a first section 67 mounted in engagement with plate 62 and a second section 68 which is hingedly engaged to first section 66, its first end and hingedly engaged to mounting post 70 on its second end, maintained in position to post 70 via mounting nut 72 allowing rotation of arm assembly 66 (as seen by arrow 73) proper positioning of buffer apparatus 22 in contact with tire 80, which will be discussed further in the overall method.

Apparatus 10 also includes, in the preferred embodiment, in FIG. 3, drive assembly 14, for imparting rotational movement to tire 80 during the rebuffing and refinishing process. Drive assembly 14 comprises variable speed, reversible rotation drive motor 82, which, in the preferred embodiment is contained in case 84. Drive motor 82, in the preferred embodiment would be a reversible rotation motor with constant torque equivalent to one and one-half horse power. There would be provided drive shaft 86 which would be in direct driving engagement with motor 82 for rotation of shaft 86. Drive motor 82 would be controlled by variable speed control dial 88, which would afford 0 to 30 RPM tire drive control adjustment. There is also provided, on/off on drive control switch 89, which would enable the on forward off/on reversible drive rotation, depending on the position of switch 89. Also provided on the top portion of case 84 would be fuse boxes 90 and 92 which would, of course, be a protection for both the drive assembly and the buff assembly in the case that each would be in the position of overload.

Shaft 86, as seen in FIG. 3, is maintained in driving engagement with drive shaft 87 within bearing bracket 91. In the preferred embodiment, rotation of shaft 86 imparts rotational movement to drive shaft 87, which in turn, during the use of apparatus 10, would rotate the automobile tire 95 to be refinished.

In the overall method of utilizing apparatus 10 in cutting grooves and whitewalling vehicle tires, the method would comprise stabilizing the vehicle by "Chucking" at least one wheel of the vehicle, to prevent the vehicle from having free movement. A vehicle jack or the like would be placed adjacent the wheel to be prepared, with the wheel being jacked up approximately three inches off the ground to allow free movement of the wheel. Apparatus 10, would then be rolled into position on roller wheels 90 and 92, with the assist of handle 93, so that the drive shaft 87 is angled slightly downward somewhat beneath the tire to be prepared, so that the tire frictionally engages the surface of shaft 87. At that position, with drive shaft 87 in contact with the wheel, the rear of apparatus 10 would be approximately one inch off of the ground so that in the positioning of oneself on the seat 94 of apparatus 10, the weight would force the rear down and the drive shaft will have increased pressure on the treads of the tire for better drive engagement.

At this point, toggle switch 89, which controls the rotation of drive shaft 87 would be switched to the proper "ON" position depending on the direction of rotation desired. In the preferred embodiment indication C W notation would indicate clockwise or rotation to the right and CC W notation would indicate counterclockwise or rotation to the left. In most cases CC W rotation would be utilized, with CC W rotation being utilized in some of the prepared functions. Following the rotation of the tire in the desired direction, the right control switch 91 would impart activation to buffing assembly motor 16 where by the particular buffing blade in position and in engagement with shaft 35 would be rotated for use. Swivel arm assembly 66 is then placed in position on swivel post 70 with the setting of locknut 72 depending on the height one would want to position the swivel arm assembly 66 on post 70. This would be determined by the size of the tire, of course.

Following the proper positioning of swivel arm 66, one would select the correct blade size, depending on the type of cut or groove to be made and the tire to be buffed. As explained earlier, thumbscrew 48 is released, and handle 49 is rotated to the position whereby the proper blade is in the top position. It is at this point pulley belt 40 is affixed to the selected pulley wheel of the blade, due to the fact that the belt in the top position has more leeway due to the distance between the central shaft 35 and the position of the wheel at this point. The dial handle 49 is then moved to the "buff" position for tightly engaging the pulley wheels between belt 40, and thumbscrew 48 is then tightened.

At this point, toggle switch 89 is slipped to the position on, and the buffing assembly is ready to be utilized in the method. The surface of the tire is then prepared and cleaned and the position on the wall of the tire it is indicated for grooving which is usually one to one and a half inches from the rim of the tire. In the off position, buffing assembly 22 is then placed into position, with the blade selected position on the tire and in contact therewith. The buff switch is then switched to the "ON" position and with the tire at a very slow speed, rotation of the tire is imparted with a groove being cut in the preferred embodiment between 1/64 and 1/32 of an inch deep into the side of the tire via rotation of the tire during the process. The rotation of the tire may be then increased once the groove has been cut in order to wisk away dust or dirt and with the application of the polymer or base coat. The polymer is usually applied with a stripper or applicator whereby the polymer is applied directly onto a rotating ball or the like from the bottle containing the polymer, as the tire is rotated up to 30 RPM's. The polymer is allowed to cover the entire area of the groove with the material being built up in the centerfirst and slowly move outward toward the edges of the roller. When the material would reach the outer edges the pressure is increased and continued use of the roller will provide a complete rolled polymer coat. Following the placing of the polymer coat, a top coat may be applied immediately, since no drying time is necessary for the complete whitewalling to be accomplished.

The apparatus of the present invention may be utilized to remove existing stripes on a tire, repair damage done to exiting straps via contact with the curb or the like, changed the appearance of existing stripes by making a dual stripe rather than a single stripe, or simply cleaning an existing stripe or buffing rised letters off of a existing wall tire. This is simply accomplished by use of the particular blade selected for use in the buffing apparatus, with the buffing taking place the same way as was explained earlier.

Because many varying and different embodiments may be made within the scope of the inventive concept herin taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus for grooving the wall portions of vehicle tires, which comprises:
    a. a movable frame:
    b. tire rotating means mounted on said frame for rotating the vehicle tire in contact with said means;
    c. a buffing assembly mounted on said frame and swivelly positioned against at least one of said walls of said tire for removing material in an annular groove around one wall of said tire upon rotation of said tire; said buffing assembly means, including:
        i. a central shaft member;
        ii. a plurality of buffing blades, each of said blades rotatable about an indepedent axis;
        iii. means for selectively interconnecting at least one of said buffing blades in driving engagement with said shaft member so that rotation of said shaft member imparts rotation to said interconnected buffing blade; and
    d. switching means for imparting selective rotation speed to said tire rotating means and selective rotation speed to each of said driven buffing blades.

2. The apparatus in claim 1, further comprising means for maneuvering said buffing blade assembly in a first position wherein one of said buffing blades is out of contact with one of said side walls of said tire to a second position wherein said selected buffing blade is in driving engagement with said side wall of said tire for cutting said annular groove thereinto.

3. The apparatus in claim 1, further comprising handle means for maneuvering said apparatus in position for use.

4. The apparatus in claim 1, further comprising seating means for allowing the user of said apparatus to serve as a counterweight for more complete engagement between said tire rotating means and said tire.

* * * * *